(12) United States Patent
Shimizu

(10) Patent No.: US 7,923,494 B2
(45) Date of Patent: Apr. 12, 2011

(54) POLYESTER RESIN COMPOSITION AND MOLDED BODY THEREOF

(75) Inventor: Yu Shimizu, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/247,689

(22) Filed: Oct. 8, 2008

(65) Prior Publication Data

US 2009/0099295 A1 Apr. 16, 2009

(30) Foreign Application Priority Data

Oct. 12, 2007 (JP) .................. 2007-266979

(51) Int. Cl.
*C08K 3/34* (2006.01)
*C08K 9/04* (2006.01)
*C08L 67/00* (2006.01)
*C08L 101/16* (2006.01)
*C08G 63/60* (2006.01)

(52) U.S. Cl. ......... 524/236; 524/442; 524/449; 514/955

(58) Field of Classification Search ............... 524/236, 524/442, 449; 514/955
See application file for complete search history.

(56) References Cited

U.S. PATENT DOCUMENTS

| 7,351,772 B2 * | 4/2008 | Yano et al. ............ 525/412 |
| 2005/0043462 A1 | 2/2005 | Yamada |
| 2009/0054559 A1 * | 2/2009 | Serizawa et al. ............ 524/9 |

FOREIGN PATENT DOCUMENTS

| EP | 1903077 | 3/2008 |
| JP | 2007-119729 | 5/2007 |
| WO | 03022927 | 3/2003 |
| WO | 2007052847 | 5/2007 |

* cited by examiner

*Primary Examiner* — Kelechi C Egwim
(74) *Attorney, Agent, or Firm* — Canon U.S.A., Inc., IP Division

(57) ABSTRACT

A polyester resin composition and a molded body formed from the polyester resin composition are provided. The polyester resin composition includes a layered silicate and a crystalline polyester. The layered silicate is ion exchanged with a dimethyldialkylammonium salt and the ion exchange amount is equal to or higher than 0.7 and less than 0.9 based on an ion exchange capacity of the layered silicate. The dimethyldialkylammonium salt may be a dimethyldioctadecylammonium salt or a dimethyldidodecylammonium salt.

8 Claims, 1 Drawing Sheet

POLYESTER RESIN COMPOSITION AND MOLDED BODY THEREOF

BACKGROUND OF THE INVENTION

1. Field of the Invention

The present invention relates to a polyester resin composition and a molded body, and more particularly to a polyester resin composition comprising a crystalline polyester and a specific organically modified layered silicate and to a molded body comprising the polyester resin composition.

2. Description of the Related Art

Crystalline polyesters are widely used as films or materials for molding because of excellent properties thereof, such as mechanical strength, heat resistance, weather resistance, and chemical resistance. Because compounding a reinforcing filler with such crystalline polyesters increases strength and heat resistance of the resin, the reinforced compositions thus obtained are advantageous as components for machinery parts. Examples of such reinforcing fillers include inorganic powders such as talc, glass fibers, and layered silicates. When such a powdered filler is used and a resin composition is obtained by melt kneading or the like, the filler has to be added at a high mixing ratio, which may affect the processability and dispersivity.

Accordingly, measures are taken to facilitate the peeling of layers in layered silicates and increase affinity thereof for resins by replacing exchangeable cations present between the layers of the layered silicate with organic onium ions. In particular, International Publication WO03/022927 discloses a method for obtaining a resin composition composed of a specific biodegradable polyester resin based on polylactic acid and an organically modified layered silicate in which ion exchange by a specific salt is performed at a ratio of 0.9 to 1.25 based on an ion exchange capacity of the layered silicate.

However, where an organically modified layered silicate with an ion exchange amount higher than 0.9 is added to a polyester, although heat resistance and rigidity are improved, impact resistance and resistance to hydrolysis may decrease.

Japanese Patent Laid-Open No. 2007-119729 discloses a method for increasing heat resistance and impact resistance in an amorphous state by compounding a methacrylic resin and an impact resistance enhancer with a polylactic acid and further adding an organically modified layered silicate and a reactive compound.

SUMMARY OF THE INVENTION

In one aspect the present invention provides a polyester resin composition comprising a crystalline polyester and a specific organically modified layered silicate in which rigidity, heat resistance, impact resistance, and resistance to hydrolysis of the resin composition are improved.

In one aspect, a polyester resin composition according to the present invention includes a layered silicate and a crystalline polyester, wherein the layered silicate is ion exchanged with a dimethyldialkylammonium salt and the ion exchange amount is equal to or higher than 0.7 and less than 0.9 based on an ion exchange capacity of the layered silicate.

Further features of the present invention will become apparent from the following description of exemplary embodiments with reference to the attached drawing.

DESCRIPTION OF THE EMBODIMENTS

Figure 1:
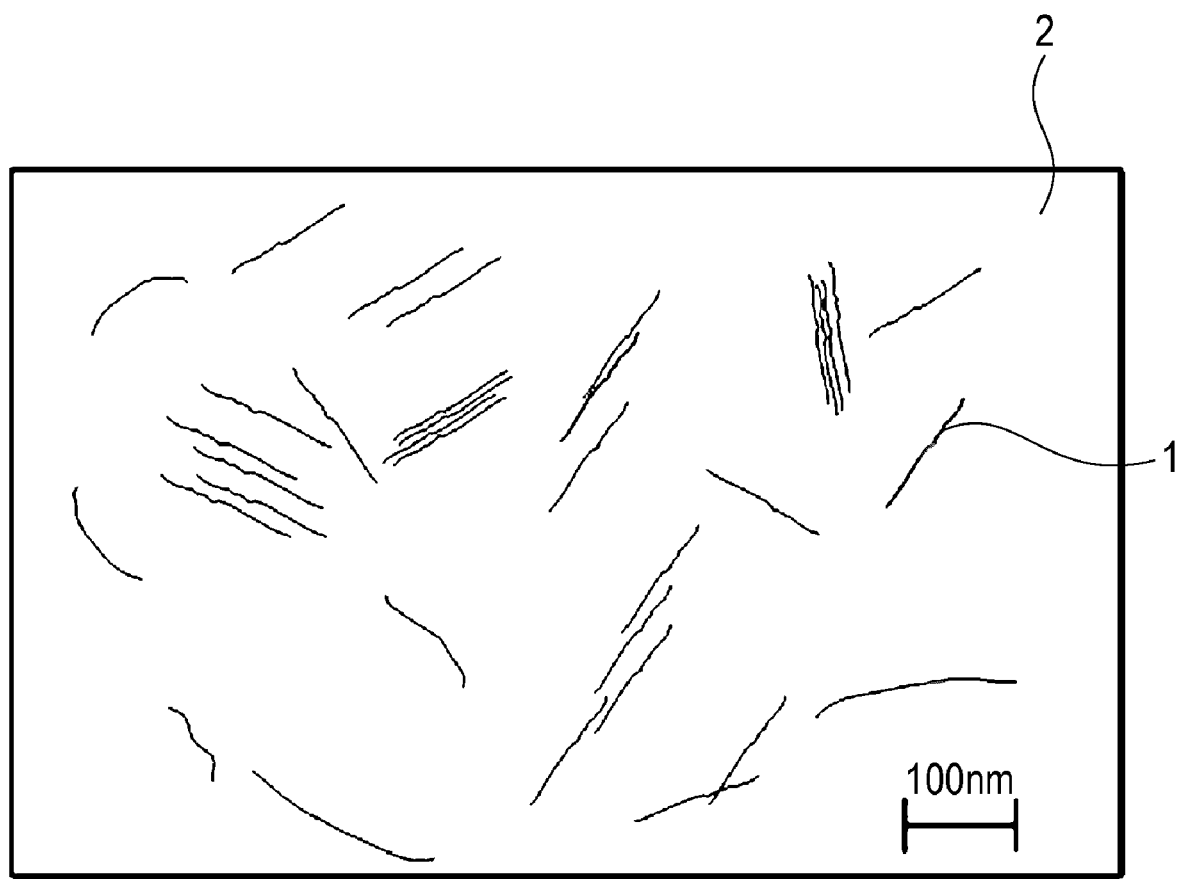
FIG. 1 is a schematic diagram illustrating the results obtained in observing a layered silicate 1 in the polyester resin composition 2 in accordance with the present invention with a transmission electron microscope. The layered structure of the organically modified layered silicates disintegrated and the layers with a thickness of about 1 nm that formed a layered silicate existed as a structure composed of one or several layers.

An embodiment of the present invention will be described below.

In one embodiment of the present invention, a polyester resin composition that excels in heat resistance, rigidity, impact resistance, and hydrolysis resistance can be obtained by producing a polyester resin composition that includes a layered silicate and a crystalline polyester, wherein the layered silicate is ion exchanged with a dimethyldialkylammonium salt and the ion exchange amount is equal to or higher than 0.7 and less than 0.9 based on an ion exchange capacity of the layered silicate.

The crystalline polyester resin constituting the polyester resin composition in accordance with the present invention, as referred to herein, may be a resin comprising at least one species selected from polycarboxylic acids including dicarboxylic acids and ester-forming derivatives thereof and at least one species selected from polyhydric alcohols including glycols, or a resin comprising a hydroxycarboxylic acid and ester-forming derivatives thereof, or a resin comprising of a cyclic ester.

Examples of dicarboxylic acids include saturated aliphatic dicarboxylic acids such as oxalic acid, malonic acid, succinic acid, glutalic acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid and ester-forming derivatives thereof, unsaturated aliphatic dicarboxylic acids such as fumaric acid, maleic acid, and itaconic acid and ester-forming derivatives thereof, aromatic dicarboxylic acids such as orthophthalic acid, isophthalic acid, terephthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, pamoic acid, and anthracenedicarboxylic acid, and ester-forming derivatives thereof, aromatic dicarboxylic acids containing a metal sulfonate group, such as 5-sodium sulfoisophthalic acid, 2-sodium sulfoterephthalic acid, 5-lithium sulfoisophthalic acid, 2-lithium sulfoterephthalic acid, 5-potassium sulfoisophthalic acid, and 2-potassium sulfoterephthalic acid, and lower alkyl ester derivatives thereof.

Examples of polycarboxylic acids other than these dicarboxylic acids include ethanetricarboxylic acid, propanetricarboxylic acid, butanetetracarboxylic acid, pyromellitic acid, trimellitic acid, trimesic acid, 3,4,3',4'-biphenyltetracarboxylic acid, and ester-forming derivatives thereof.

Examples of glycols include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cyclohexane diol, 1,3-cyclohexane diol, 1,4-cyclohexane diol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecane diol, polyethylene glycol, polytrimethylene glycol, polytetramethylene glycol, and aromatic glycols such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl) methane, 1,2-bis(p-hydroxyphenyl)ethane, bisphenol A, bisphenol C, 2,5-naphthalene diol, and glycols obtained by addition of ethylene oxide to these glycols.

Examples of polyhydric alcohols other than these glycols include trimethylolmethane, trimethylolethane, trimethylolpropane, pentaerythritol, glycerol, and hexanetriol.

Examples of hydroxycarboxylic acids include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, and ester-forming derivatives thereof.

Examples of cyclic esters include ε-caprolactone, β-propiolactone, β-methyl-β-propiolactone, δ-valerolactone, glycolide, and lactide.

Examples of ester-forming derivatives of polycarboxylic acids and hydroxycarboxylic acids include alkyl esters, acid chlorides, and acid anhydrides thereof.

Examples of polyester resins include polyethylene terephthalate, polypropylene terephthalate, polybutylene terephthalate, polyhexamethylene terephthalate, polycyclohexane-1,4-dimethylterephthalate, neopentylterephthalate, polyethylene isophthalate, polyethylene phthalate, polybutylene naphthalate, polyhexamethylene naphthalate, polylactic acid, polyhydroxybutyrate, polybutylene succinate, polyglycolic acid, polycaprolactone, polyethylene-2,6-naphthalate, polyethylene-α,β-bis(2-chlorophenoxy)ethane-4,4'-dicarboxylate, polyethylene succinate, polybutylene succinate, polybutylene succinate adipate, polyhexamethylene succinate, polyethylene adipate, polyhexamethylene adipate, polybutylene adipate, polyethylene oxalate, polybutylene oxalate, polyneopentyl oxalate, polyethylene sebacate, polybutylene sebacate, polyhexamethylene sebacate, poly(α-hydroxy acids) such as polyglycolic acid and polylactic acid and copolymers thereof, poly(ω-hydroxyalkanoate) such as poly(ε-caprolactone) and poly(β-propiolactone), poly(β-hydroxyalkanoates) such as poly(3-hydroxybutyrate), poly(3-hydroxyvalerate), poly(3-hydroxycaproate), poly(3-hydroxyheptanoate), poly(3-hydroxyoctanoate), and poly(4-hydroxybutyrate) and copolymer polyesters thereof. These compounds may be used individually or in combinations of two or more thereof.

In one embodiment of the present invention, the polyester resin comprises polylactic acid. Polylactic acid as referred to herein is obtained by polymerization of lactic acid. This acid has attracted attention from the standpoint of biomass utilization and biodegradability. An optical purity of L form or D form of lactic acid may be equal to or higher than 90%, to provide an increased melting point. Further, the molecular weight of polylactic acid polymer may be 50,000 to 500,000, as a weight-average molecular weight to provide a good balance of mechanical properties and moldability.

In one embodiment, the layered silicate used in accordance with the present invention comprises a swellable layered silicate. Examples of suitable layered silicates include smectites such as montmorillonite and saponite, swellable synthetic mica, graphite, imogolite, and other general nanocomposite materials. In one embodiment, the layered silicate comprises at least one of montmorillonite and swellable mica. For example, the layered silicate may comprise a swellable mica, such as a swellable synthetic mica. In one embodiment, the layered silicate may be a single layer or be laminated and dispersed.

A dimethyldialkylammonium salt can be used as an agent for organically modifying these layered silicates. The alkyl group can contain 2 to 22 carbon atoms. In one embodiment, the alkyl group contains 8 to 22 carbon atoms, such as 12 to 18 carbon atoms. Where the number of carbon atoms is less than 2, the molecular weight of the organic modifier is small and the effect of enlarging the interlayer spacing in the layered silicate may be reduced. On the other hand, where the number of carbon atoms is more than 22, the compound may become more lipophilic and the ion exchange reaction may be more difficult to perform. In this case, the alkyl group may be linear or branched. The organic modifiers may be used individually or in combinations thereof. In one embodiment, the dimethyldialkylammonium salt comprises at least one of a dimethyldioctadecylammonium salt and a dimethyldidodecylammonium salt.

An embodiment of an organic modification reaction of layered silicates will be explained below. A smectite as a layered silicate is caused to swell and dispersed in warm water at 60° C. to 90° C. A dimethyldialkylammonium salt is gradually added thereto, stirring is performed for about 20 hours to 30 hours in warm water, and the exchangeable ions present between the layers of the layered silicate are replaced with the ionized organic modifier. The suspension is filtered, the obtained solids are repeatedly washed with warm water, and the remaining sodium ions and excess organic modifier are removed. Finally, a powdered organically modified layered silicate is obtained by drying in an oven and grinding with a grinding machine.

The amount of the organic modifier that is added to the layered silicate can equal to or higher than 0.7 eq and less than 0.9 eq, preferentially 0.75 eq to 0.83 eq, per 1 eq of the ion exchange capacity of the layered silicate. Where the amount added is less than 0.7 eq, the exchange of sodium ions of the layered silicate and ammonium ions may be insufficient and dispersivity of the layered silicate may decrease. Where the amount added is equal to or more than 0.9 eq, the impact resistance of the polyester resin composition may decrease, and it may be difficult to obtain both heat resistance and impact resistance.

In one embodiment, the organically modified layered silicate is then dispersed in the resin with a twin-screw kneader. First, the resin is charged into the twin-screw kneader that has been adjusted to a temperature equal to or higher than the melting point of the resin, and then kneading is performed, while adding the organically modified layered silicate by using a metered feeder. The layers of the silicate are gradually peeled by a shear stress generated by the screws of the kneader, and the layered silicate is dispersed as a monolayer structure or a structure containing several layers.

In one embodiment, the amount added of the layered silicate can be equal to or higher than 0.5 part by weight and equal to or lower than 30 parts by weight, such as equal to or higher than 1 part by weight and equal to or lower 10 parts by weight, and even equal to or higher than 1 part by weight and equal to or lower than 5 part by weight per 100 parts by weight of the crystalline polyester resin. When the amount added of the organically modified layered silicate is less than 0.5 part by weight, the increase in strength or heat resistance of the resin composition may be insignificant. On the other hand, when the amount added exceeds 30 parts by weight, deterioration of the matrix resin may be enhanced under the effect of a quaternary ammonium ion component contained in the layered silicate and undesirable defects that create obstacles for molding may be produced. Further, the organically modified layered silicates may be used individually or in combinations.

The resin compound produced can be pelletized with a pelletizer. The polyester resin composition is then molded to obtain a molded body. This method may be performed by injection molding, extrusion molding, press molding, blow molding, and rotary molding.

Examples of molded bodies include, but at not limited to, casings or internal components of business machines, films, etc.

EXAMPLES

The present invention will be described below in greater detail based on examples thereof. However, the present invention is not limited to the below-described examples, and it goes without saying that various modifications can be made without departing from the scope and essence of the present invention.

The following measurement methods were used to measure the below-described properties.

(1) Ion Exchange Amount

Ion exchange amount was found from the ignition loss (%) of the organically modified layered silicate at 1000° C. and the molecular weight of interlayer cations by the following equation.

Ion exchange amount (mmol/100 g)=(Ignition loss/Molecular weight of cation)×{100/(100−Ignition loss)}×1000

(2) Ion Exchange Capacity

Ion exchange capacity was found based on a cation exchange capacity measurement method for bentonite (JBAS-106-77) that represents a test method stipulated by a Japanese Bentonite Manufacturers Association standard. Thus, all the ion-exchangeable cations located between the layers of a layered silicate were replaced with $NH_4^+$ with a 1N aqueous solution of ammonium acetate having a pH value adjusted to 7. The ion exchange was performed using an apparatus to which a leaching solution container was connected in the vertical direction. After thorough washing with water and ethyl alcohol, the $NH_4^+$-type layered silicate was immersed in an aqueous solution of potassium chloride with a concentration of 10 wt. %, and $NH_4^+$ contained in the sample was replaced with $K^+$. Then, $NH_4^+$ ions that eluted in the course of such ion exchange reaction were neutral titrated using a 0.1N aqueous solution of sodium hydroxide. As a result, the ion exchange capacity (millieq/100 g) of the swellable layered silicate serving as a starting material was found from the following equation.

Ion exchange capacity=$VC$/10M, where M is a weight (g) of the layered silicate, V is a volume (L) of the aqueous solution of potassium chloride with a concentration of 10 wt. % that was used for ion exchange, and C is a concentration of $NH_4^+$ (mol/L) found by the neutral titration.

(3) Relative Degree of Crystallization

A strip-type specimen of the resin composition and a crystal reference sample of polylactic acid were analyzed at a temperature rise rate and a temperature decrease rate of 20° C./min by using a differential scanning calorimeter (DSC) Q100 (trade name, manufactured by TA Instrument). A product obtained by heat treating polylactic acid LACEA H100J (trade name, manufactured by Mitsui Chemical Co., Ltd.) for 30 min at 110° C. in an oven was used as a crystal reference sample of polylactic acid. A relative degree of crystallization was calculated by the following equation in which a crystallization energy calculated from an exothermic peak area in DSC measurements was denoted by $\Delta H_c$, a crystal melting energy calculated from a peak area of endothermic peak observed in crystal dissolution close to 170° C. was denoted by $\Delta H_m$, and a crystal melting energy of the crystal reference sample of polylactic acid was denoted by $\Delta H_{m0}$.

Relative degree of crystallization=$(\Delta H_m - \Delta H_c)/\Delta H_{m0}$

Example 1

A total of 0.99 L of warm water at 60° C. was added under stirring to 100 g of swellable fluoromica (sodium type) SOMASIF ME-100 (trade name, ion exchange capacity 120 meq/100 g, manufactured by CO-OP Chemicals), which is a layered silicate, and the swellable fluoromica was dispersed on the warm water while being caused to swell. Then, 1.41 L of an aqueous solution containing 5 parts by weight of dimethyldioctadecylammonium chloride was gradually added and the components were stirred for 24 h at a maintained temperature of 60° C. to induce ion exchange of sodium ions. A precipitate was filtered and repeatedly washed with ultra-pure water to remove the residual sodium ions. A powdered organically modified layered silicate was then obtained by drying and grinding. In this case, it was confirmed that 0.83 of ion exchange capacity of the layered silicate was ion exchanged with dimethyldioctadecylammonium ions.

Example 2

An organically modified layered silicate was obtained by the same method as in Example 1, except that the aqueous solution containing 5 parts by weight of dimethyldioctadecylammonium chloride was used in an amount of 1.27 L. In this case, it was confirmed that 0.75 of ion exchange capacity of the layered silicate was ion exchanged with dimethyldioctadecylammonium ions.

Example 3

An organically modified layered silicate was obtained by the same method as in Example 1, except that 1.00 L of an aqueous solution containing 5 parts by weight of dimethyldidodecylammonium chloride instead of dimethyldioctadecylammonium chloride was used. In this case, it was confirmed that 0.83 of ion exchange capacity of the layered silicate was ion exchanged with dimethyldidodecylammonium ions.

Example 4

A resin composition was obtained by melt kneading, while adding in a metered fashion 5 parts by weight of the organically modified layered silicate obtained in Example 1 to 95 parts by weight of a resin of polylactic acid LACEA H100J (trade name, manufactured by Mitsui Chemical Co., Ltd.), in a twin-screw kneader LABOPLASTMILL (trade name, screw diameter 26 mm, L/D=25, manufactured by Toyo Seiki Seisakusho) The kneading was performed at 180° C. with the two screws rotating in the same direction at a revolution speed of 150 rpm.

Example 5

The obtained resin composition was pelletized, and a strip-type specimen (80 mm×10 mm×t4.0 mm) in an amorphous state was produced from the pellets at a mold temperature of 40° C. by using an injection molding apparatus FN1000-5ADN (trade name, manufactured by Nissei Plastic Industrial Co., Ltd.). The strip-type specimen thus obtained was held for 30 min in an oven at 110° C. to obtain a strip-type specimen in a crystal state. The relative degree of crystallization in this case was 1.05.

Example 6

A strip-type specimen in a crystal state was produced in the same manner as in Example 5, except that holding was performed for 5 min at a mold temperature of 110° C. The relative degree of crystallization in this case was 1.12.

Example 7

A strip-type specimen in a crystal state was produced by a method identical to that of Example 5 by using resin composition pellets obtained using an organically modified layered silicate obtained in Example 2 instead of the organically modified layered silicate obtained in Example 1 in the process of Example 4. The relative degree of crystallization in this case was 1.05.

Example 8

A strip-type specimen in a crystal state was produced by a method identical to that of Example 5 by using resin composition pellets obtained using an organically modified layered silicate obtained in Example 3 instead of the organically modified layered silicate obtained in Example 1 in the process of Example 4. The relative degree of crystallization in this case was 1.08.

Example 9

A strip-type specimen in a crystal state was produced by a method identical to that of Example 5 by using resin composition pellets obtained by adding in a metered fashion 1 part by weight of the organically modified layered silicate obtained in Example 1 to 99 parts by weight of resin in the process of Example 4. The relative degree of crystallization in this case was 1.00.

Example 10

A strip-type specimen in a crystal state was produced by a method identical to that of Example 5 by using resin composition pellets obtained by adding in a metered fashion 10 parts by weight of the organically modified layered silicate obtained in Example 1 to 90 parts by weight of resin in the process of Example 4. The relative degree of crystallization in this case was 1.17.

Comparative Example 1

A strip-type specimen in a crystal state was produced by a method identical to that of Example 5 by replacing the organically modified layered silicate obtained in Example 1 with resin composition pellets obtained by using SOMASIF MAE (trade name, manufactured by CO-OP Chemicals) in which 1.0 of ion exchange capacity of the layered silicate was ion exchanged with dimethyldioctadecylammonium ions in the process of Example 4. The relative degree of crystallization in this case was 1.05.

Comparative Example 2

A strip-type specimen in a crystal state was produced by a method identical to that of Example 6 by replacing the organically modified layered silicate obtained in Example 1 with an organically modified layered silicate in which 0.83 of ion exchange capacity of the layered silicate was ion exchanged with dipolyoxyethylenealkylmethylammonium ions in the process of Example 4. The relative degree of crystallization in this case was 1.14.

Comparative Example 3

A resin composition was produced by adding in a metered fashion 5 parts by weight of an organically modified layered silicate SOMASIF MEE (trade name, manufactured by CO-OP Chemicals) in which 1.0 of ion exchange capacity of the layered silicate has been ion exchanged with dipolyoxyethylenealkylmethylammonium ions to a mixture including 70 parts by weight of a resin of polylactic acid LACEA H100J, 10 parts by weight of polymethyl methacrylate resin PARAPET HR-L (trade name, manufactured by Kuraray Co., Ltd.), and METABLEN C223A (trade name, manufactured by Mitsubishi Rayon Co., Ltd.) as an agent improving impact resistance in the process of Example 4, and melt kneading. A strip-type specimen in a crystal state was produced by a method identical to that of Example 5 by using the resin composition pellets obtained in the above-described manner. The relative degree of crystallization in this case was 0.95.

Comparative Example 4

A strip-type specimen in a crystal state was produced by a method identical to that of Example 5 by using resin composition pellets obtained using commercial layered silicate SOMASIF ME-100 (trade name, manufactured by CO-OP Chemicals) that has not been organically modified instead of the organically modified layered silicate obtained in Example 1 in the process of Example 4. The relative degree of crystallization in this case was 0.95.

Comparative Example 5

In the process of Example 5, the produced specimen in an amorphous state was not heated in an oven. The relative degree of crystallization in this case was 0.00, that is, an amorphous state was assumed.

Comparative Example 6

In the process of Example 4, no organically modified layered silicate was added. A strip-type specimen in a crystal state was produced by a method identical to that of Example 5 by using the obtained resin composition pellets. The relative degree of crystallization in this case was 1.00.

Comparative Measurement 1

Plane spacing of organically modified layered silicates was measured once in each case with an X-ray diffractometer (XRD): X 'PERT PRO (trade name, manufactured by Phillips) with respect to the strip-type specimens in a crystal state obtained in Examples 5 to 10 and Comparative Examples 1, 3 to 5. When a resin with a high affinity for an organic modifier was intercalated between the layers of the organically modified layered silicates and the plane spacing of the organically modified layered silicates was enlarged, the diffraction peaks of the organically modified layered silicates shifted to a low angle side and peaks decreased.

Comparative Measurement 2

The strip-type specimens in a crystal state obtained in Examples 5 to 10 and Comparative Examples 1, 3 to 5 were sliced into thin sheets by using ULTRAMICROTOME EM UC6 (trade name, manufactured by Ernst Leitz Optical Instruments Co.) and the dispersion state of the organically modified layered silicates was confirmed with a transmission electron microscope H800 (trade name, manufactured by Hitachi, Ltd.).

Comparative Measurement 3

The dispersivity evaluation of the organically modified layered silicates in the resin compositions in a crystallized state obtained in Examples 5 to 10 and Comparative Examples 1, 3 to 5 was performed by the methods of Comparative Measurement 1 and 2. The results are shown in Table 1. In Table 1, the reference symbol ○ denotes a case in which the transmission electron microscope observations confirmed that the layered structure of the organically modified layered silicates disintegrated and the layers with a thickness of about 1 nm that formed a layered silicate existed as a structure composed of one or several layers. What's more, the XRD confirmed the increase in plane spacing and decrease in peaks. On the other hand, the reference symbol x denotes the case in which a layered structure consisting of 10 or more layers was maintained and an aggregated state was assumed.

TABLE 1

| Resin composition | Dispersivity |
|---|---|
| Polyester resin composition in crystal state of Example 5 | ○ |
| Polyester resin composition in crystal state of Example 6 | ○ |
| Polyester resin composition in crystal state of Example 7 | ○ |
| Polyester resin composition in crystal state of Example 8 | ○ |
| Polyester resin composition in crystal state of Example 9 | ○ |
| Polyester resin composition in crystal state of Example 10 | ○ |
| Polyester resin composition in crystal state of Comparative Example 1 | ○ |
| Polyester resin composition in crystal state of Comparative Example 2 | ○ |
| Polyester resin composition in crystal state of Comparative Example 3 | ○ |
| Polyester resin composition in crystal state of Comparative Example 4 | X |
| Polyester resin composition of Comparative Example 5, which is in amorphous state | ○ |

As shown in Table 1, the organically modified layered silicates were dispersed up to a level in which the layers with a thickness of about 1 nm were present as a structure composed of one to several layers.

Comparative Measurement 4

Heat resistance and rigidity were evaluated by the below-described physical property tests by using the resin pellets of polylactic acid and strip-type specimens obtained in Examples 5 to 10 and Comparative Examples 1 to 6.

(1) Evaluation of Heat Resistance

Heat resistance of resin compositions of the above-described examples and comparative examples was determined by deflection temperature under load (DTUL) by using the produced strip-type specimens. The measurements were performed according to ISO 75 standard twice in each case by using a flat vise, a stress of 0.45 MPa, a temperature rise rate of 2° C./min, and an HDT/VSPT TEST DEVICE TM-4126 (trade name, manufactured by Ueshima Seisakusho Co., Ltd.) as a measurement device.

(2) Evaluation of Flexural Modulus

A flexural modulus of resin compositions of the above-described examples and comparative examples was evaluated by a three-point bending test by using the produced strip-type specimens. The measurements were performed according to an ISO 178 standard four times in each case by using a precision multifunctional device AUTOGRAPH AG-IS (trade name, manufactured by Shimazu Corp.) as a measurement device.

(3) Evaluation of Impact Resistance

Impact resistance of resin compositions of the above-described examples and comparative examples was evaluated by a Charpy impact value by using the produced strip-type specimens. The measurements were performed according to an ISO 179 standard four times in each case by using notch processing of a Type A notch with a NOTCHING TOOL A-3 (trade name, manufactured by Toyo Seiki Seisakusho) and a DIGITAL IMPACT TEST MACHINE DG-UB (trade name, manufactured by Toyo Seiki Seisakusho) as a measurement device.

(4) Evaluation of Resistance to Hydrolysis

Resistance to hydrolysis of resin compositions of the above-described examples and comparative examples was evaluated by a melt flow rate after the produced strip-type specimens were allowed to stay for 500 h in a thermo-hygrostat of 70° C. and 85% RH and ground. The measurements were performed according to ASTM-D-1238 standard twice in each case under the conditions of a temperature of 190° C., a retention time of 240 sec, and a load of 2.16 kg by using a SEMIAUTO MELT FLOW INDEXER 2A (trade name, manufactured by Toyo Seiki Seisakusho). It can be supposed that fluidity of a melt is high when the weight that passes through is large and that the molecular weight of a resin decreases on hydrolysis. In the present examination, the melt flow index measured upon grinding the strip-type specimens before and after introducing the samples into the thermo-hygrostat was denoted by M0, M500, respectively, and the resistance to hydrolysis was evaluated based on the following criteria.

Resistance to hydrolysis ○: M500/M<2.
Resistance to hydrolysis Δ: 2≦M500/M0≦5.
Resistance to hydrolysis x: M500/M0>5.

The results of physical property tests are shown in Table 2.

TABLE 2

| | Deflection temperature under load (° C.) | Flexural modulus (MPa) | Charpy impact value (kJ/m$^2$) | Resistance to hydrolysis |
|---|---|---|---|---|
| Polyester resin composition in crystal state of Example 5 | 120 | 4665 | 5.1 | ○ |
| Polyester resin composition in crystal state of Example 6 | 125 | 4650 | 5.1 | ○ |

TABLE 2-continued

| | Deflection temperature under load (° C.) | Flexural modulus (MPa) | Charpy impact value (kJ/m$^2$) | Resistance to hydrolysis |
|---|---|---|---|---|
| Polyester resin composition in crystal state of Example 7 | 123 | 4693 | 3.7 | ○ |
| Polyester resin composition in crystal state of Example 8 | 125 | 4743 | 4.7 | ○ |
| Polyester resin composition in crystal state of Example 9 | 114 | 3994 | 5.9 | ○ |
| Polyester resin composition in crystal state of Example 10 | 128 | 5407 | 3.4 | ○ |
| Polyester resin composition in crystal state of Comparative Example 1 | 114 | 4185 | 2.7 | Δ |
| Polyester resin composition in crystal state of Comparative Example 2 | 125 | 5389 | 1.5 | ○ |
| Polyester resin composition in crystal state of Comparative Example 3 | 117 | 3444 | 1.0 | X |
| Polyester resin composition in crystal state of Comparative Example 4 | 90 | 4211 | 1.3 | X |
| Polyester resin composition of Comparative Examples 5, which is in amorphous state | 55 | 2364 | 1.9 | X |
| Polyester resin composition in crystal state of Comparative Example 6 | 109 | 3831 | 3.3 | X |

Table 2 shows that in the compositions of Examples 5 to 10 in accordance with the present invention, the heat resistance, rigidity, impact resistance, and resistance to hydrolysis were all simultaneously improved over those of polylactic acid without the addition of an organically modified layered silicate shown in Comparative Example 6. Thus, the compositions of Examples 5 to 10 provide polyester resin compositions comprising the organically modified layered silicate without decreasing impact resistance and resistance to hydrolysis.

On the other hand, in Comparative Example 1 in which the ion exchange amount is equal to exchange capacity, the heat resistance and rigidity were improved, but impact resistance and resistance to hydrolysis decreased. In Comparative Example 2 in which an ammonium salt other than dimethyldialkylammonium salt was used, heat resistance and resistance to hydrolysis were improved, but impact resistance decreased. Furthermore, in Comparative Example 3 in which the second resin and other additives such as METABLEN C233A were compounded, heat resistance increased, but impact resistance and resistance to hydrolysis decreased. In addition, compounding the second resin and a large number of other additives may inhibit physical properties of crystalline polyesters and may also raise costs. Also, where a polyester resin composition is used in an amorphous state, heat resistance and resistance to hydrolysis may be low. The compositions of Examples 5 to 10 provide polyester resin compositions having improved heat resistance, rigidity, impact resistance, and resistance to hydrolysis, for example without requiring compounding of the second resin and other additives. In Comparative Example 4 in which a layered silicate that was not organically modified was added and in Comparative Example 5 in which an amorphous state was attained, the heat resistance, impact resistance, and resistance to hydrolysis decreased.

Accordingly, in one aspect the present invention relates to the dispersing of a reinforcing additive when improving physical properties of a resin such as a plastic, and the present invention can be used in a variety of industrial fields employing resins that require heat resistance, rigidity, impact resistance, and resistance to hydrolysis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-266979, filed Oct. 12, 2007 which is hereby incorporated by reference herein in its entirety.

What is claimed is:

1. A polyester resin composition comprising a layered silicate and a crystalline polyester, wherein the layered silicate is ion exchanged with a dimethyldialkylammonium salt and the ion exchange amount is equal to or higher than 0.7 and less than 0.9 based on an ion exchange capacity of the layered silicate.

2. The polyester resin composition according to claim 1, wherein the dimethyldialkylammonium salt comprises at least one of a dimethyldioctadecylammonium salt and a dimethyldidodecylammonium salt.

3. The polyester resin composition according to claim 1, wherein the layered silicate comprises swellable mica.

4. The polyester resin composition according to claim 1, wherein the crystalline polyester comprises polylactic acid.

5. The polyester resin composition according to claim 1, wherein the layered silicate is contained in an amount of equal to or more than 0.5 part by weight and equal to or less than 30 parts by weight per 100 parts by weight of the crystalline polyester.

6. The polyester resin composition according to claim 1, wherein the layered silicate is a single layer or is laminated and dispersed.

7. A molded body that is molded using the polyester resin composition according to claim 1 as the molding composition.

8. The molded body according to claim 7, wherein a relative degree of crystallization of the molded body is equal to or higher than 0.9.

* * * * *